FIP7902 OR AI 136
Examiner
BEST AVAILABLE COPY
J. J. Savage
Dredger
No. 136. A. D. Mar 11, 1856.
Additional Improvement of Patent No. 14,068 dated Jan. 8, 068
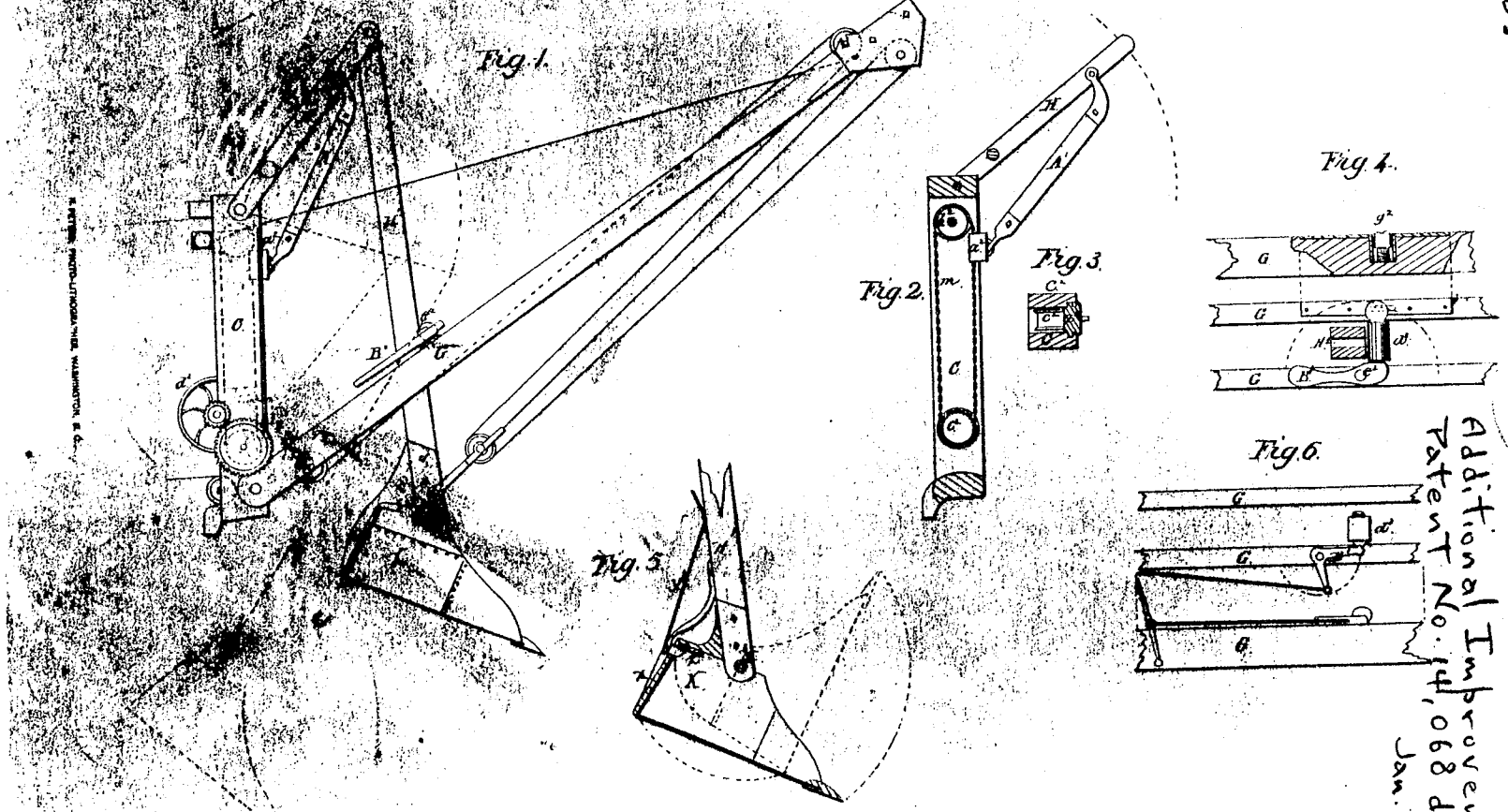
R. PETERS, PHOTO-LITHOGRAPHER, WASHINGTON, D. C.